United States Patent
Harada et al.

(10) Patent No.: US 7,790,306 B2
(45) Date of Patent: Sep. 7, 2010

(54) NICKEL HYDROGEN STORAGE BATTERY

(75) Inventors: Yasuyuki Harada, Moriguchi (JP);
Makoto Ochi, Moriguchi (JP);
Toshihiro Sakatani, Moriguchi (JP);
Kei Ikoma, Moriguchi (JP); Masao Takee, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 838 days.

(21) Appl. No.: 11/723,964

(22) Filed: Mar. 22, 2007

(65) Prior Publication Data
US 2007/0224497 A1    Sep. 27, 2007

(30) Foreign Application Priority Data
Mar. 24, 2006   (JP) .............................. 2006-083114

(51) Int. Cl.
| | |
|---|---|
| *H01M 6/10* | (2006.01) |
| *H01M 2/14* | (2006.01) |
| *H01M 6/04* | (2006.01) |
| *H01M 4/62* | (2006.01) |
| *H01M 4/58* | (2006.01) |

(52) U.S. Cl. ...................... 429/94; 429/129; 429/206; 429/217; 429/218.2; 429/223

(58) Field of Classification Search ................ 429/166, 429/206, 223, 94, 217, 218.2, 129
See application file for complete search history.

(56) References Cited

U.S. PATENT DOCUMENTS
6,468,687 B1 * 10/2002 Nagae et al. .................. 429/94

FOREIGN PATENT DOCUMENTS
| | | | |
|---|---|---|---|
| EP | 0848436 | * | 6/1998 |
| JP | 2002-180330 A | | 6/2002 |
| JP | 2004-31293 A | | 1/2004 |
| JP | 2004-335159 A | | 11/2004 |

* cited by examiner

*Primary Examiner*—Patrick Ryan
*Assistant Examiner*—Thomas H. Parsons
(74) *Attorney, Agent, or Firm*—Westerman, Hattori, Daniels & Adrian, LLP

(57) ABSTRACT

A negative electrode plate of a nickel hydrogen storage battery includes a nonaqueous polymer binder and has an effective surface area per unit capacity of 70 $cm^2$/Ah or more. The density of the first and second separators between positive and negative electrode plates ranges from 450 kg/$m^3$ to 600 kg/$m^3$. The nonwoven fabrics of the separators are formed by combining microfibers and compound fibers through melting portions of the compound fibers. The fibers have a virtually circular cross-section. The microfibers and the compound fibers have a diameter ranging from 1 μm to less than 5 μm and a diameter ranging from 5 μm to 15 μm, respectively. The proportion of the microfibers to whole fibers ranges from 10 percent by mass to 20 percent by mass. At least one of the nonwoven fabrics of the separators is subjected to sulfonation treatment.

8 Claims, 2 Drawing Sheets

NICKEL HYDROGEN STORAGE BATTERY

BACKGROUND OF THE INVENTION

1. Field of the Invention

The present invention relates to a nickel hydrogen storage battery.

2. Description of the Related Art

A nickel hydrogen storage battery is used for various purposes. Because of its high output power, the nickel hydrogen storage battery is also applied to a power source for a vehicle, such as a hybrid vehicle and an electric vehicle. When used for such a vehicle, the nickel hydrogen storage battery is required to exert its high output power and capacity retention characteristics. A conventional way of achieving high output is, for example, increasing the facing area of positive and negative electrode plates while making the plates and a separator thin. Examples of a measure for improving the capacity retention characteristics include the trapping of nitric-acid-group shuttle by applying a sulfonated separator and the prevention of self-decomposition, i.e., discharge reaction caused exclusively in a positive electrode due to oxygen generation by adding rare-earth elements to the positive electrode.

If the separator is designed to be thinner for increasing the facing area, (1) it is required to increase the density of a nonwoven fabric composing the separator to prevent a short circuit; and (2) in light of electrolyte retention of the separator, the fibers of the nonwoven fabric need to be finer to increase the surface area of the fibers. The nonwoven fabric of a battery separator which is disclosed in Unexamined Japanese Patent Publication No. 2004-335159 is composed of microfibers of 40 percent by mass or less (a fiber diameter of less than 4 μm) and compound high-strength polypropylene-based fibers including a melting component of 60 percent by mass or more. This nonwoven fabric can be considered to meet the above conditions (1) and (2) to some extent.

The sulfonated separator is prone to be degraded in strength as the fibers composing the separator get damaged, as compared to a separator subjected to another hydrophilizing treatment such as fluorine gas treatment. For this reason, a cylindrical nickel hydrogen storage battery using a sulfonated separator has the possibility of an internal short circuit caused by positive and negative electrode plates breaking the separator and coming into direct contact to each other.

The sulfonated separator is inferior in liquid absorbability to separators subjected to other hydrophilizing treatments than sulfonation treatment. Especially in a high output battery, it is required to secure a transmission path, i.e., conductive path for ion in between positive and negative electrode plates, so that an electrolytic solution is permeated into the separator by vacuum injection. In this respect, a separator subjected to the fluorine gas treatment is excellent in liquid absorbability and hydrophilicity. In a nickel hydrogen storage battery using a separator subjected to fluorine gas treatment, the electrolytic solution continues to be permeated into the separator because of the liquid absorbability of the separator itself even after injection. As a result, the conductive path is secured in full measure, which provides high output. Plasma treatment, surface-active agent (surfactant) treatment and the like also produce the same effects as the fluorine gas treatment.

A cylindrical nickel hydrogen storage battery disclosed in Unexamined Japanese Patent Publication No. 2004-31293 uses two kinds of separators in connection with relationship of self-discharge prevention with short-circuit resistance and output characteristics.

Among the two separators of the battery described in Publication No. 2004-31293, one of them is subjected, for example, to fluorine gas treatment to keep strength, and the other to sulfonation treatment. The fluorine gas-treated separator is disposed outside of a positive electrode plate, and the sulfonated separator inside of the positive electrode plate.

However, a nickel hydrogen storage battery in which a sulfonated battery separator described in Unexamined Japanese Patent Publication No. 2004-335159 is used, and in which a negative electrode plate includes a nonaqueous polymer binder for preventing an increase of internal pressure of the battery, has the problem that output is inversely decreased if the area of polar plates are increased to a certain value or more. This problem stands out especially when a sulfonated separator like the one disclosed in Publication No. 2004-31293 and a separator subjected to the fluorine gas treatment are used at the same time.

SUMMARY OF THE INVENTION

It is an object of the present invention to provide a nickel hydrogen storage battery in which output is improved even if area of polar plates is increased to a certain level or more.

The inventors have clarified a cause of the problem and solved the problem in the process of various studies for achieving the object, and have conceived the present invention.

More specifically, the inventors disassembled a charged and discharged battery and studied a negative electrode plate. They consequently found a phenomenon that if area of the negative electrode plate is increased to a given value or more, there generates a region in which contact of an alkaline electrolyte is poor.

This phenomenon is prominent in a battery separator disclosed in Unexamined Japanese Patent Publication No. 2004-335159 if the ratio of microfibers advantageous in electrolyte retention is high. The phenomenon conspicuously occurs when a sulfonated separator is used, especially in the case of using two kinds of separators, one of which is subjected to fluorine gas treatment to secure strength, whereas the other is subjected to sulfonation treatment, and area of a negative electrode plate is increased to a given value or more. Likewise, the same phenomenon notably takes place if the negative electrode plate contains a nonaqueous polymer binder.

The inventors considered that such a phenomenon emerged because the alkaline electrolyte does not uniformly permeate through the separators when the alkaline electrolyte was injected into the battery by vacuum injection, and this created a region in which the permeation of the alkaline electrolyte was insufficient in the separator that is in contact with the negative electrode plate. In other words, it was considered that the alkaline electrolyte was unevenly distributed or localized in between the positive and negative electrode plates. In the inventors' view, due to this localization, a uniform conductive path was not formed all over the separators, so that the whole region of the polar plates did not effectively contribute to cell reaction even if the area was increased, and the high output was discouraged.

The inventors further studied the localization of the alkaline electrolyte which discourages the high output and located the following cause.

Along with thinning of separators, in order to prevent an internal short circuit and to improve liquid retention characteristics, the separators are enhanced in density and increased in surface area. To be more specific, an average fiber diameter of the separators is reduced by increasing the ratio of microfibers, and the like. When a separator that is enhanced in density or increased in surface area is used, a gap between polar plates and the separator is dispersed. As a result, permeation of an alkaline electrolyte into the separator becomes difficult, and the alkaline electrolyte is unevenly distributed or localized.

If two kinds of separators are used, because of difference between a sulfonated separator and a fluorine gas-treated separator in terms of liquid absorbability, the distribution of the alkaline electrolyte becomes uneven also between the two separators. This accelerates the localization of the alkaline electrolyte.

If the negative electrode plate contains a nonaqueous polymer binder, the alkaline electrolyte is further localized in a gap between the negative electrode plate and the separators, depending upon water repellency of the binder.

In consideration of the cause thus found, the inventors have improved means for evenly distributing the alkaline electrolyte between the positive and negative electrode plates and conceived the present invention.

The present invention provides a nickel hydrogen storage battery having a spiral electrode assembly contained in a container with an alkaline electrolyte. The electrode assembly includes a negative electrode plate containing hydrogen storage alloy particles and a nonaqueous polymer binder for binding the hydrogen storage alloy particles, the negative electrode plate having an effective surface area per unit capacity of 70 $cm^2$/Ah or more, a positive electrode plate that is wound with the negative electrode plate in a spiral configuration and includes nickel hydroxide as positive active material, a first separator disposed between an outer surface of the positive electrode plate and an inner surface of the negative electrode plate, and a second separator disposed between an inner surface of the positive electrode plate and an outer surface of the negative electrode plate. The first and second separators between the positive and negative electrode plates have a density in an inclusive range of from 450 $kg/m^3$ to 600 $kg/m^3$. Each of the first and second separators is formed by subjecting a nonwoven fabric to hydrophilizing treatment. The nonwoven fabric of the first and second separators has a virtually circular cross-section. The nonwoven fabric is formed by combining compound fibers and microfibers through melting portions of the compound fibers. The compound fibers are constituted by polyolefin-based resin which have a diameter in an inclusive range of from 5 µm to 15 µm and have an outer circumferential surface that is provided at least in a part thereof with the melting portion that has a lower melting point than other portion. The microfibers are constituted by polyolefin-based resin which have a virtually circular cross-section and have a diameter in a range of from 1 µm to less than 5 µm. The proportion of the microfibers to a blend of the microfibers and the compound fibers falls in an inclusive range of from 10 percent by mass to 20 percent by mass. At least one of the nonwoven fabrics of the first and second separators is subjected to sulfonation treatment as the hydrophilizing treatment.

A nickel hydrogen storage battery claimed in claim 1 according to the invention includes the first and second separators at least one of which is subjected to the sulfonation treatment, and has good self-discharge characteristics. The battery also has a negative electrode plate that contains a nonaqueous binder and has an effective surface area per unit capacity of 70 $cm^2$/Ah or more, so that the negative electrode plate is suitable for high output.

In this battery, the nonwoven fabrics of the first and second separators are constituted by the microfibers and the compound fibers, and the microfibers and the compound fibers have a virtually circular cross-section. This achieves uniformity in size, shape and distribution, i.e., arrangement of numerous fine pores that are partitioned in the inside of the nonwoven fabrics and are interconnected to each other. Moreover, in these separators, the microfibers have a diameter ranging from 1 µm to less than 5 µm, and the compound fibers from 5 µm to 15 µm, and the proportion of the microfibers to the blend of the microfibers and the compound fibers falls in a range of from 10 percent by mass to 20 percent by mass. Therefore, the fine pores of the nonwoven fabrics are more uniform in size, shape and distribution. In order to properly maintain occupied volume of the separators in the electrode assembly, the density of the first and second separators needs to be 450 $kg/m^3$ or more. As the density of the first and second separators is set to be 600 $kg/m^3$ or less, the fine pores are prevented from being reduced in capacity by compression of the separators.

Since the fine pores in the nonwoven fabrics of the first and second separators are uniform in terms of size and the like, and the capacity of the fine pores is prevented from being reduced as described above, the permeability of the alkaline electrolyte is enhanced with respect to the first and second separators. The enhancement in permeability compensates the low permeability in the sulfonated separator, so that the alkaline electrolyte uniformly permeates through the first and second separators. In other words, the alkaline electrolyte is evenly distributed in between the positive and negative electrode plates. Consequently, in the battery, the whole region of the polar plates whose area is increased effectively contributes to cell reaction, and the high output is accomplished.

Preferably, one of the nonwoven fabrics of the first and second separators is subjected to the sulfonation treatment as the hydrophilizing treatment, and the other nonwoven fabric to at least one of hydrophilizing treatments, which is selected from fluorine gas treatment, plasma treatment and surfactant treatment, as the hydrophilizing treatment.

A preferable nickel hydrogen storage battery maintains good self-discharge characteristics since the nonwoven fabric of either one of the first and second separators is subjected to the sulfonation treatment.

At the same time, the distribution of the alkaline electrolyte becomes more even in the battery since the sulfonated separator is enhanced in permeability of the alkaline electrolyte, and the other separator is subjected to the fluorine gas treatment, plasma treatment or surfactant treatment to be further upgraded in permeability. Consequently, in this battery, the whole region of the polar plates whose area is increased effectively contributes to cell reaction, and this achieves higher output.

Preferably, the nonwoven fabric of the first separator is subjected to at least one of the hydrophilizing treatments, which is selected from the fluorine gas treatment, the plasma treatment and the surfactant treatment, whereas the nonwoven fabric of the second separator is subjected to the sulfonation treatment.

According to a preferable nickel hydrogen storage battery, the nonwoven fabric of the second separator which is disposed between the inner surface of the positive electrode plate and the outer surface of the negative electrode plate is subjected to the sulfonation treatment, and the nonwoven fabric of the first separator which is disposed between the outer surface of the positive electrode plate and the inner surface of the negative electrode plate is subjected to the fluorine gas treatment, plasma treatment or surfactant treatment. The sulfonation treatment reduces the strength of the second separator by several dozen percent to be lower than the strength of the first separator. To solve this problem, in the above battery, a fluorine gas-treated, plasma-treated or surfactant treated separator with higher strength is used as the first separator that is applied with larger tension at the time of being wound. This prevents the first separator from being ruptured, and then prevents an internal short circuit.

Preferably, the nonwoven fabric of the first separator is subjected to the fluorine gas treatment. This is because the first separator subjected to the fluorine gas treatment excels in ability to absorb the alkaline electrolyte and in long-term stability.

Preferably, the proportion of the microfibers to the blend of the microfibers and the compound fibers falls in an inclusive range of from 13 percent by mass to 17 percent by mass.

In a preferable nickel hydrogen storage battery, the fine pores of the nonwoven fabrics are more uniform in size and the like since the proportion of the microfibers to the blend of the microfibers and the compound fibers falls in a range of from 13 percent by mass to 17 percent by mass. This further improves the permeability of the alkaline electrolyte through the first and second separators, so that the distribution of the alkaline electrolyte between the positive and negative electrode plates becomes more uniform. Consequently, higher output is accomplished in this battery.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
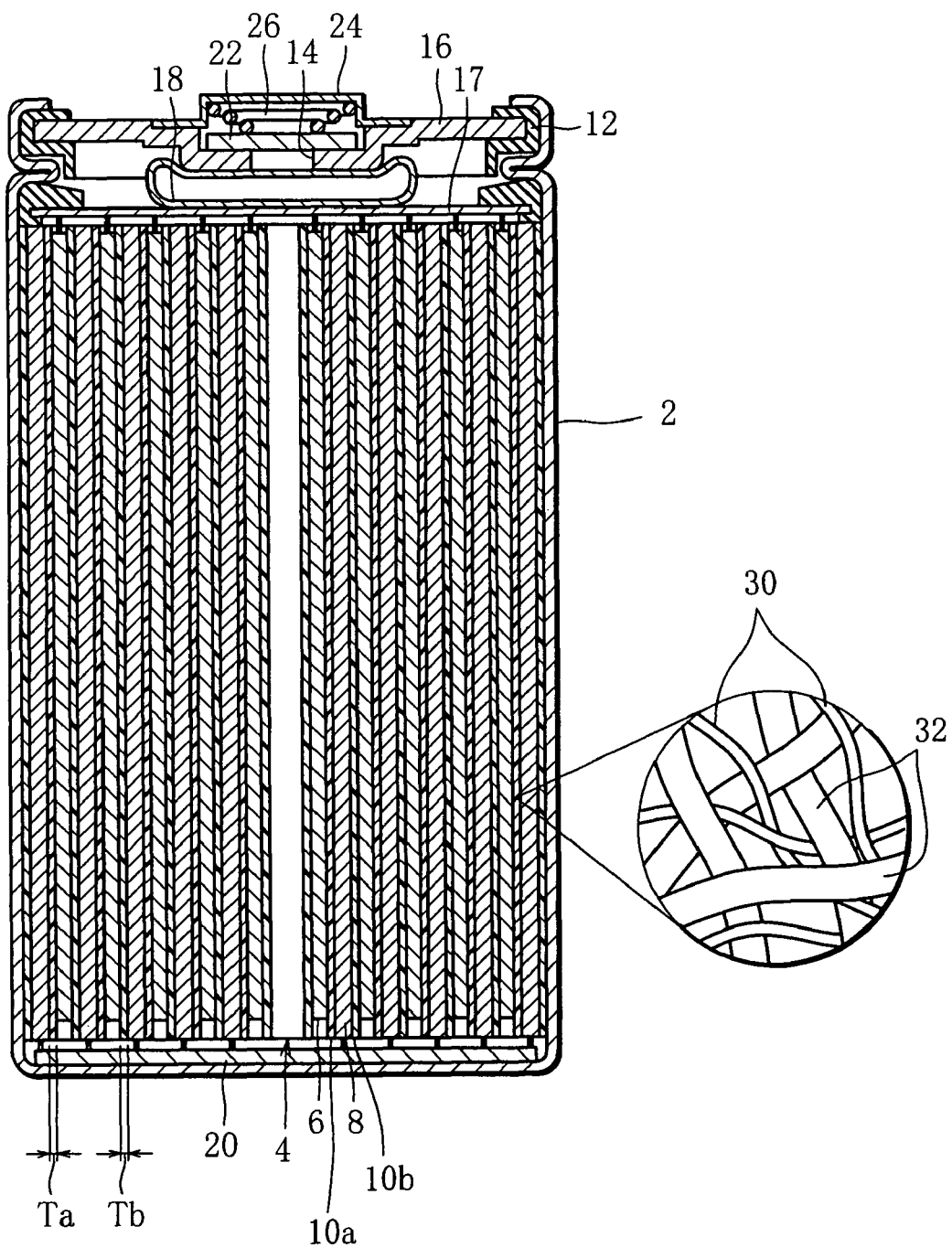
FIG. 1 is a sectional view showing a nickel hydrogen storage battery according to one embodiment of the present invention, and a partially enlarged view in a circle shows a schematic texture of a nonwoven fabric of a first separator.

FIG. 1 shows a nickel hydrogen storage battery according to a first embodiment of the present invention.

The battery includes an exterior can 2 in a shape of a cylinder with a bottom. The exterior can 2 contains a spiral electrode assembly 4 with an alkaline electrolyte, not shown. The alkaline electrolyte is a caustic alkaline solution containing potassium hydroxide (KOH) as a major solute. The alkaline electrolyte may further contain either one or both of lithium hydroxide (LiOH) and sodium hydroxide (NaOH).

The electrode assembly 4 is formed by winding in a spiral configuration a positive electrode plate 6, a negative electrode plate 8, a first separator 10a and a second separator 10b each having a band-like shape. The first separator 10a is positioned in between an outer surface of the positive electrode plate 6 and an inner surface of the negative electrode plate 8, and the second separator 10b in between an inner surface of the positive electrode plate 6 and an outer surface of the negative electrode plate 8.

A disk-like cover plate 16 having a gas venting hole 14 in the center thereof is fitted in an open end of the exterior can 2 through a ring-like insulating gasket 12. The insulating gasket 12 and the cover plate 16 are fixed by caulking an open end edge of the exterior can 2.

Disposed between the positive electrode plate 6 of the electrode assembly 4 and an inner surface of the cover plate 16 are a positive collector 17 that electrically connects therebetween and a positive lead 18. In between the negative electrode plate 8 of the electrode assembly 4 and a bottom surface of the exterior can 2, there is disposed a negative collector 20 that electrically connects therebetween.

Disposed on an outer surface of the cover plate 16 are valve element 22 to close the gas venting hole 14 and a cylindrical positive terminal 24 with a flange that is so set as to surround the valve element 22. A compression coil spring 26 is placed between a rear surface of the valve element 22 and an end wall of the positive terminal 24. The compression coil spring 26 presses the valve element 22 against the cover plate 16 by given urging force.

The positive electrode plate 6, the negative electrode plate 8, the first separator 10a, and the second separator 10b will be described below in detail.

The positive electrode plate 6 is a sintered nickel electrode and has a porous sintered nickel substrate as a positive substrate. A positive mixture is maintained in fine pores of the sintered nickel substrate. The positive mixture contains nickel hydroxide as positive active material, cobalt hydroxide as conductive material, and yttrium hydroxide for preventing a discharge reaction from taking place exclusively in the positive electrode due to oxygen generation.

The negative electrode plate 8 is a hydrogen storage alloy electrode and has, for example, a punching metal as a negative substrate. Through holes of the punching metal are filled with a negative mixture, and a layered negative mixture is maintained on both surfaces of the punching metal. Given that surface area of the negative mixture layers located on both the surfaces of the negative electrode plate 8 is X, and that capacity of the negative electrode plate 8 is Y, the ratio of the surface area X to the capacity Y (effective surface area per unit capacity), namely X/Y, is 70 $cm^2$/Ah or more.

The negative mixture contains hydrogen storage alloy particles and a binder, and also a conductive material as needed. The hydrogen storage alloy particles comprise, for example, $AB_5$-type or $AB_{3.5}$-type hydrogen storage alloy, and can electrochemically store and release hydrogen serving as negative active material. The capacity Y of the negative electrode plate 8 can be found from the product of hydrogen storage amount per unit mass of the alloy under the condition in which the temperature is 40° C., and hydrogen equilibrium pressure is 1 MPa, and alloy mass of the negative electrode plate 8.

For example, carbon powder may be used for the conductive material.

The binder comprises nonaqueous polymer molecules. For example, one or more kinds selected from copolymers, each of which contains two or more kinds selected from acrylic ester, ethyl methacrylate, aromatic olefin, conjugated diene, and olefin may be used, other than SBR (styrene-butadiene latex) and PTFE (polytetrafluoroethylene). As the binder, a small amount of aqueous thickener may be used together with the nonaqueous polymer binder as needed. For example, one or more kinds selected from CMC (Carboxymethyl cellulose), PEO (polyethylene oxide), PVA (polyvinyl alcohol), polyacrylic acid, and the like may be used.

Each of the first separator 10a and the second separator 10b is produced by subjecting a nonwoven fabric constituted by polyolefin-based synthetic resin fibers to hydrophilizing treatment. Synthetic resins that may be used as the polyolefin-based synthetic resin include, for example, polyethylene, polypropylene, etc.

To be more specific, the nonwoven fabrics of the first and second separators 10a and 10b contain microfibers 30 and compound fibers 32 as major components as schematically shown in the circle of FIG. 1. The proportion of the microfibers 30 to a blend of the microfibers 30 and the compound fibers 32 ranges from 10 percent by mass to 20 percent by mass, inclusively, and preferably from 13 percent by mass to 17 percent by mass, inclusively.

Figure 2A:
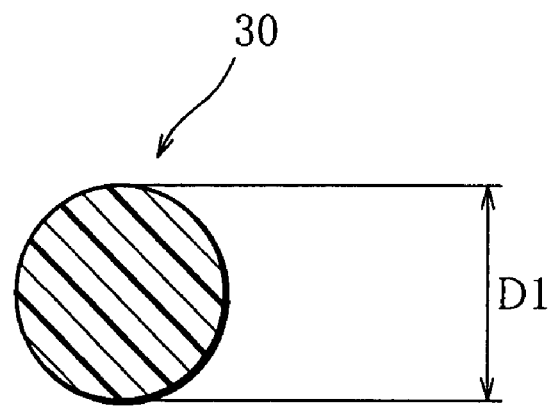
FIG. 2A is a cross-sectional view schematically showing microfibers making up the nonwoven fabric of the first separator and that of a second separator used in the battery shown in FIG. 1.

As illustrated in FIG. 2A, the microfibers 30 have a virtually circular cross-section and have a diameter (average fiber diameter) D1 ranging from 1 µm to less than 5 µm. The microfibers 30 have a single structure made up, for example, of one kind of polyolefin-based resin, and can be produced by a method described in Unexamined Japanese Patent Publication No. 2004-335159. In other words, a sea-island structure fiber is extruded while carrying out control of a spinning die with respect to a sea component, and the sea component of the obtained fiber is removed. An island component that remains after this process may be used as microfibers.

Figure 2B:
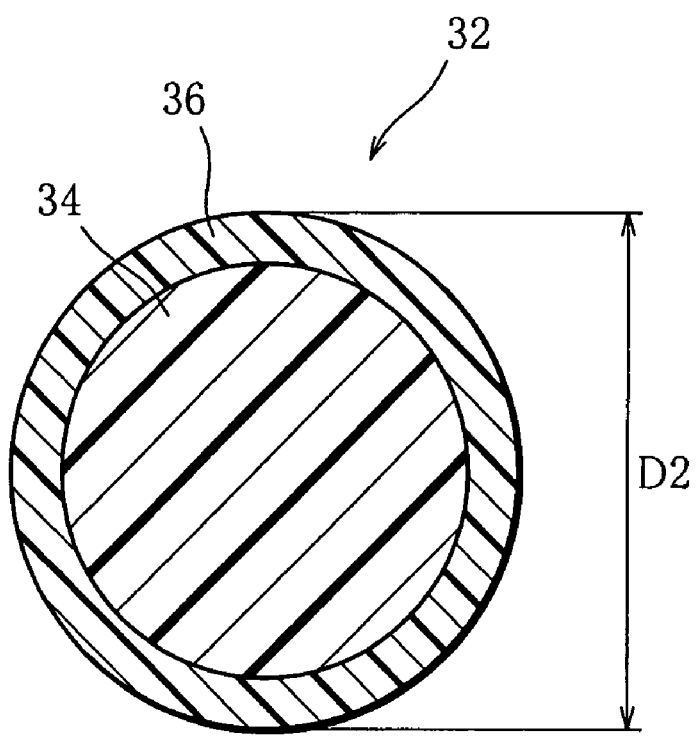
FIG. 2B is a cross-sectional view schematically showing compound fibers making up the nonwoven fabrics of the first and second separators used in the battery shown in FIG. 1.

The compound fibers 32 have a virtually circular cross-section as illustrated in FIG. 2B, and have a diameter (average fiber diameter) D2 ranging from 5 µm to 15 µm. The compound fibers 32 have, for example, a core-in-sheath structure, in which a part or the whole of a surface of a core material 34 is covered with a sheath material 36. The core material 34 and the sheath material 36 consist of respective polyolefin-based resins. The polyolefin-based resin of the sheath material 36 has a melting point lower than a melting point of the polyolefin-based resin of the core material 34. In the nonwoven fabrics, the microfibers 30 and the compound fibers 32 are bound together, and the compound fibers 32 are also bound together, by fusion bonding through the sheath material 36 therebetween.

The compound fibers 32 can be produced, for example, by a method described in Unexamined Japanese Patent Publication No. 2002-180330. That is to say, the compound fibers 32 can be created by drawing undrawn compound yarn that has been subjected to melt spinning. The compound fibers 32 may have an eccentric or sea-island structure as long as it includes a portion that has a lower melting point than the other portion at least in a part of an outer circumferential surface as a melting portion for binding the microfibers 30 and the compound fibers 32.

When it is said that the nonwoven fabrics of the first and second separators 10a and 10b contain the microfibers 30 and the compound fibers 32 as major components, it means that the proportion of the blend of the microfibers 30 and the compound fibers 32 to the whole fibers contained in the nonwoven fabrics is equal to or more than 95 percent by mass. It is preferable that the fibers contained in the nonwoven fabrics be simply two kinds, namely the microfibers 30 and the compound fibers 32.

When it is said that the microfibers 30 and the compound fibers 32 have a virtually circular cross-section, it means that a ratio of a minimum diameter Dmin to a maximum diameter Dmax (Dmin/Dmax×100) is equal to or more than 85 percent, as viewed into each cross-section of the microfibers 30 and the compound fibers 32.

Basis weight (areal weight) of the nonwoven fabrics used for the first and second separators 10a and 10b ranges, for example, from 30 g/m$^2$ to 60 g/m$^2$, inclusively. Thicknesses (winding thicknesses Ta and Tb) of the first and second separators 10a and 10b in a position sandwiched between the positive and negative electrode plates 6 and 8 in the electrode assembly 4 are in an inclusive range of, for example, from 0.04 mm to 0.12 mm. Density (basis weight/winding thicknesses Ta and Tb) of the first and second separators 10a and 10b in the position sandwiched between the positive and negative electrode plates 6 and 8 in the electrode assembly 4 is in an inclusive range of from 450 kg/m$^3$ to 600 kg/m$^3$.

At least one of the nonwoven fabrics of the first and second separators 10a and 10b is subjected to sulfonation treatment as hydrophilizing treatment. Preferably, the nonwoven fabric of the second separator 10b positioned in between the inner surface of the positive electrode plate 6 and the outer surface of the negative electrode plate 8 is subjected to the sulfonation treatment.

Although the other nonwoven fabric of the first separator 10a or of the second separator 10b may be subjected to the sulfonation treatment as hydrophilizing treatment, it is preferable to subject the other nonwoven fabric to at least one of hydrophilizing treatments which is selected from fluorine gas treatment, plasma treatment and surfactant treatment. As the fluorine gas treatment is superior to the others in ability to absorb the alkaline electrolyte and in long-term stability after the treatment, it is more preferable to carry out the fluorine gas treatment. Stated differently, it is preferable that the nonwoven fabrics of the first and second separators 10a and 10b be subjected to respective kinds of hydrophilizing treatments.

The nonwoven fabrics of the first and second separators 10a and 10b can be produced, for example, by dry forming, wet forming, spunbond, melt-blown process (melt blown) or the like, using the microfibers 30 and the compound fibers 32 as major materials. It is desirable, however, to produce the nonwoven fabrics by the wet forming in light of density.

Each of the hydrophilizing treatments with respect to the nonwoven fabric is carried out, for example, in the following manner.

The sulfonation treatment is conducted by processing the nonwoven fabric with acid containing a sulfate group, such as sulfuric acid or fuming sulfuric acid. The sulfonation treatment introduces to the fibers of the nonwoven fabric a functional group, such as a sulfonic group ($-SO_3H$) or the like induced by sulfur.

The fluorine gas treatment is conducted by processing the nonwoven fabric, for example, with mixed gas obtained by adding oxygen gas, $CO_2$ gas, sulfur dioxide gas or the like to fluorine gas diluted with inactive gas. The fluorine gas treatment introduces a hydrophilic group, such as OH, COOH and $SO_3H$, to the fibers of the nonwoven fabric.

In the surfactant treatment, the nonwoven fabric is dried after being immersed in a solution dissolved with a surfactant. As the surfactant, for example, a saturated carboxylate salt, such as a fatty acid salt, an alkyl ethoxy carboxylate salt, and an acylated amino-acid salt, a sulfate ester salt, sulfonate or the like may be used. The surfactant is absorbed by the fibers of the nonwoven fabric in the surfactant treatment, so that hydrophilicity is enhanced.

In the plasma treatment, oxygen gas is brought into a plasma state to produce oxygen radicals, and the nonwoven fabric is processed with these oxygen radicals. The plasma treatment introduces a hydrophilic functioning group, such as OH and COOH group, to the fibers of the nonwoven fabric.

In the nickel hydrogen storage battery, at least one of the first separator 10a and the second separator 10b is subjected to the sulfonation treatment. Therefore, the nickel hydrogen storage battery has good self-discharge characteristics.

The battery is suitable for high output since the negative electrode plate 8 is thin and large in size from having an effective surface area per unit capacity of 70 cm$^2$/Ah or more and contains the nonaqueous binder.

In this nickel hydrogen storage battery, the nonwoven fabrics of the first and second separators 10a and 10b are formed by binding the microfibers 30 and the compound fibers 32 together. Since both the microfibers 30 and the compound fibers 32 have a virtually circular cross-section, the microfibers 30 and the compound fibers 32 are bound together in the uniformly distributed state in the first and second separators 10a and 10b.

Further, the microfibers 30 and the compound fibers 32 are bound together in a more uniformly distributed state in the first and second separators 10a and 10b since the diameter D1 of the microfibers 30 falls in the range of from 1 μm to less than 5 μm, the diameter D2 of the compound fibers 32 from 5 μm to 15 μm, and the proportion of the microfibers 30 to the blend of the microfibers 30 and the compound fibers 32 is in the range of from 10 percent by mass to 20 percent by mass.

The numerous fine pores interconnected to each other partitioned in the inside of the nonwoven fabrics of the first and second separators 10a and 10b as described above. Since the microfibers 30 and the compound fibers 32 are bound together in the uniformly distributed state, the fine pores become uniform in size, shape and distribution (arrangement) as well.

It is required that the density of the first and second separators 10a and 10b is equal to or more than 450 kg/m$^3$ in order to properly maintain occupied volume of the separators in the electrode assembly 4. At the same time, if the first and second separators 10a and 10b have a density of 600 kg/m$^3$ or less, the fine pores are prevented from being reduced in capacity even if the first and second separators 10a and 10b are compressed between the positive electrode plate 6 and the negative electrode plate 8.

Since the fine pores in the nonwoven fabrics of the first and second separators 10a and 10b are uniform in size and the like, and are prevented from being reduced in capacity, permeability of the alkaline electrolyte through the first and second separators 10a and 10b is enhanced. The enhancement of the permeability compensates low liquid absorbability in one of the separators which has been subjected to the sulfonation treatment. Therefore, the alkaline electrolyte uniformly permeates through the first and second separators 10a and 10b. In other words, the alkaline electrolyte is evenly distributed in between the positive and negative electrode plates 6 and 8. As a result, in this battery, the whole region of the positive and negative electrode plates 6 and 8 that have been increased in area effectively contributes to cell reaction, which upgrades the high output.

In the above nickel hydrogen storage battery, if one of the first and second separators 10a and 10b which has been subjected to the sulfonation treatment is enhanced in the permeability of the alkaline electrolyte, and if the other separator is then subjected to the fluorine gas treatment, the plasma treatment or the surfactant treatment so that the permeability in the other separator is further enhanced, the distribution of the alkaline electrolyte becomes more uniform. Consequently, the whole region of the positive and negative electrode plates 6 and 8 that have been increased in area more effectively contributes to the cell reaction. This makes it possible to achieve higher output.

In the above nickel hydrogen storage battery, if the nonwoven fabric of the second separator 10b disposed in between the inner surface of the positive electrode plate 6 and the outer surface of the negative electrode plate 8 is subjected to the sulfonation treatment, and the nonwoven fabric of the first separator 10a disposed in between the outer surface of the positive electrode plate 6 and the inner surface of the negative electrode plate 8 is subjected to the fluorine gas treatment, the plasma treatment or the surfactant treatment, the first separator 10a is prevented from being ruptured, and an internal short circuit is prevented from occurring for the following reason.

Strength of the second separator 10b is reduced by the sulfonation treatment by several dozen percent, and is lower than that of the fist separator 10a. Therefore, a separator subjected to the fluorine gas treatment or the like and thus provided with more strength is applied to the first separator 10a that is applied with larger tension at the time of winding the electrode assembly 4. This prevents a rupture of the first separator 10a and an occurrence of the internal short circuit.

Further in the above nickel hydrogen storage battery, the proportion of the microfibers 30 to the blend of the microfibers 30 and the compound fibers 32 is in the range of from 13 percent by mass to 17 percent by mass, the fine pores of the nonwoven fabrics become more uniform in size and the like. As a result, the permeability of the alkaline electrolyte through the first and second separators 10a and 10b is improved, and the distribution of the alkaline electrolyte in between the positive and negative electrode plates 6 and 8 then becomes more uniform. This consequently enables higher output.

EMBODIMENTS

Embodiment 1

1. Fabrication of the Negative Electrode Plate

Metal materials were weighed and mixed so that composition becomes $Nd_{0.9}Mg_{0.1}(Ni_{0.9}Co_{0.03}Al_{0.07})_{3.5}$. A resulting mixture was smelted and formed into ingot in a high-frequency melting furnace. The ingot was heated under argon atmosphere at a temperature of 1000° C. for 10 hours to adjust a crystal structure in the ingot. Subsequently, the ingot was mechanically pulverized under inert atmosphere, and particles of sizes between 400 mesh and 200 mesh were sifted out. In this way, rare earth-Mg—Ni-based hydrogen storage alloy particles having the above composition were obtained. The rare earth-Mg—Ni-based hydrogen storage alloy particles thus obtained is 25 μm in average particle diameter corresponding to a weight integral of 50 percent in particle size distribution that was measured by using a laser diffraction/scattering-method particle size analyzer.

The obtained alloy particles of 100 parts by mass was mixed with SBR (styrene-butadiene latex) of 0.5 parts by mass as a nonaqueous polymer binder, CMC (carboxymethyl cellulose) of 0.3 parts by mass as thickener, and a proper amount of purified water, to thereby prepare slurry for a negative electrode. A punching sheet made of nickel which was applied with the slurry for a negative electrode was flat-rolled and cut after being dried at room temperature. In this manner, a negative electrode plate was produced, which had an effective surface area, namely total of surface areas of two negative mixture layers maintained by both the faces of the negative electrode plate (height×width×2), of 990 cm$^2$.

The obtained negative electrode plate was made to store hydrogen until hydrogen equilibrium pressure became 1.0 MPa at temperature of 40° C. Negative electrode capacity that was calculated from hydrogen storage amount at this point was 13.5 Ah.

2. Fabrication of the Positive Electrode Plate

A porous sintered nickel substrate having a porosity of 85 percent was immersed in a mixed aqueous solution which contains nickel nitrate, cobalt nitrate and yttrium nitrate and has a specific gravity of 1.75. The sintered substrate maintaining nickel salt and cobalt salt in fine pores thereof by the immersion was then immersed in a sodium hydroxide (NaOH) solution of 25 percent by mass, and the nickel salt and the cobalt salt were converted into nickel hydroxide and cobalt hydroxide, respectively. Subsequently, the sintered substrate was thoroughly cleansed by water to remove the sodium hydroxide solution therefrom. After being dried, the porous sintered nickel substrate was made to maintain the nickel hydroxide and the cobalt hydroxide in the fine pores thereof.

The porous sintered nickel substrate was subjected six times to filling process including the steps of immersion in the mixed aqueous solution, immersion in the sodium hydroxide solution, cleansing and drying. The sintered substrate was then dried at room temperature and cut into given dimension. In this way, a sintered nickel electrode in which filling density of the nickel hydroxide and the cobalt hydroxide in the fine pores is 2.5 g/cm$^3$ was fabricated.

The sintered nickel electrode thus obtained had an effective surface area, namely total of areas of regions of both the faces of the electrode, in which a positive mixture is filled (height× width×2), of 920 cm$^2$.

3. Fabrication of the First and Second Separators (1) Fabrication of the Nonwoven Fabrics As compound fibers, high-strength compound fibers having core-in-sheath structure and an average fiber diameter of 12 μm were prepared. The fibers included core material made of polypropylene and sheath material made of low-melting polyethylene, and had thermal adhesion characteristics. As microfibers, high-strength polypropylene micro fibers with an average fiber diameter of 2 μm were prepared. A mixture of the compound fibers of 90 parts by mass and the microfibers of 10 parts by mass was dispersed in a solution containing a surfactant, to thereby produce fiber slurry. Subsequently, a nonwoven fabric having a basis weight of 50 g/m$^2$ was produced by wet forming including the steps of filtering the fiber slurry for making a web and drying the web at a drying temperature (binding temperature) of about 135° C.

(2) Hydrophilizing Treatment (Fluorine Gas Treatment) of the First Separator

The obtained nonwoven fabric was processed by mixed gas of fluorine gas diluted with nitrogen gas and sulfur dioxide gas. As a result, the surfaces were improved and provided with hydrophilicity.

(3) Hydrophilizing Treatment (Sulfonation Treatment) of the Second Separator

The obtained nonwoven fabric was immersed in fuming sulfuric acid and provided with a sulfonic group and hydrophilicity. In the nonwoven fabric after the sulfonation treatment, the ratio of sulfur atoms to carbon atoms (S/C) was 2.3 to 1000.

(4) Thickness Adjustment of the First and Second Separators

Thicknesses of the nonwoven fabrics subjected to the hydrophilizing treatments were adjusted by putting the fabrics through between a pair of heating rollers. As a result, the band-like first and second separators in an unwound state were produced. In this process, the thicknesses (original thicknesses) of the unwound first and second separators were both adjusted to 0.14 mm.

4. Assembly of a Nickel Metal Hydrogen Battery

The obtained positive and negative electrode plates, and first and second separators were wound while applied pressure is adjusted. A spiral electrode assembly was thus produced. In this process, the first separator was placed in between the outer surface of the positive electrode plate and the inner surface of the negative surface, and the second separator in between the inner surface of the positive electrode plate and the outer surface of the negative electrode plate. In this state, the plates and the separators were wound so that the thicknesses (winding thicknesses), or density, of the first and second separators in the electrode assembly was equal to a given value. In addition, the winding was carried out so that an end portion of the sintered nickel substrate serving as a substrate of the positive electrode plate protruded from one end portion of the electrode assembly, and that an end portion of the punching metal serving as a substrate of the negative electrode plate protruded from the other end portion.

A disk-like positive collector having a large number of holes was welded onto the sintered nickel substrate protruding from the one end portion in the electrode assembly. At the same time, a disk-like negative collector having a large number of holes was welded onto the punching metal protruding from the other end portion in the electrode assembly.

Thereafter, a cylindrical body serving as a positive lead was also welded to the positive collector. To be more concrete, the cylindrical body was formed by obliquely cutting off the both end portions of a pipe (made of nickel and having a thickness of 0.3 mm, for example) having an oval cross-section. The cylindrical body was placed on a diameter of the positive collector, and a lower base of the cylindrical body was spot-welded to the positive collector.

After the positive lead was welded, the electrode assembly was contained in an exterior can, and the negative collector was welded onto the bottom surface of the exterior can. In the next place, a potassium hydroxide solution with a concentration of 30 percent by mass was injected into the exterior can under reduced pressure (vacuum injection) as electrolyte. A seal member that was separately prepared was welded onto an upper base of the cylindrical body. The seal member included a cover plate, an insulating gasket, a valve element, a compression coil spring and a positive terminal. The cover plate was welded onto the upper base of the cylindrical body.

The seal member was pressed toward the electrode assembly by a punch so that the cylindrical body was compressed and deformed. Then, the open end edge of the exterior can was caulked inward, to thereby produce a cylindrical nickel hydrogen storage battery having a nominal capacity of 6.0 Ah.

Embodiment 2

A battery of Embodiment 2 was assembled in the same manner as in Embodiment 1 except that the compound fibers of 85 parts by mass and the microfibers of 15 parts by mass were mixed together in the step of making the fiber slurry.

Embodiment 3

A battery of Embodiment 3 was assembled in the same manner as in Embodiment 2 except that both the first and second separators were subjected to the sulfonation treatment.

Embodiment 4

A battery of Embodiment 4 was assembled in the same manner as in Embodiment 1 except that the compound fibers of 80 parts by mass and the microfibers of 20 parts by mass were mixed together in the step of making the fiber slurry.

COMPARATIVE EXAMPLE 1

A battery of Comparative Example 1 was assembled in the same manner as in Embodiment 2 except that the electrode assembly was wound so that winding thicknesses of the first and second separators were small in order to increase the density of the first and second separators.

COMPARATIVE EXAMPLE 2

A battery of Comparative Example 2 was assembled in the same manner as in Embodiment 1 except that the compound fibers of 75 parts by mass and the microfibers of 25 parts by mass were mixed together in the step of making the fiber slurry.

COMPARATIVE EXAMPLE 3

A battery of Comparative Example 3 was assembled in the same manner as in Embodiment 1 except that deformed fibers of 10 parts by mass were added and mixed with the compound fibers of 80 parts by mass and the microfibers of 10 parts by mass in the step of making the fiber slurry.

The deformed fibers include split microfibers of polypropylene and those of high-density polyethylene. These split microfibers have a sector-shaped cross-section. Given that a diameter of a circle having area equal to area of the sector-shaped cross-section is a fiber diameter, an average fiber diameter of each of the split microfibers is 4 μm.

Such deformed fibers can be obtained by processing a split fiber bundle by a beater, for example, for 10 minutes and splitting the bundle. The split fiber bundle is formed by extruding polypropylene portions that will be the split microfibers of polypropylene and high-density polyethylene portions that will be the split microfibers of high-density polyethylene together. In a cross-section of the split fiber bundle, the polypropylene portions and the high-density polyethylene portions each having a sector shape are alternately arranged in a radial pattern like sections of an orange. A bunch of the polypropylene portions and the high-density polyethylene portions is formed in a circle as a whole.

COMPARATIVE EXAMPLE 4

A battery of Comparative Example 4 was assembled in the-same manner as in Comparative Example 3 except that the compound fibers of 40 parts by mass which have an average fiber diameter of 12 μm, the high-density polypropylene fibers of 40 parts by mass which have an average fiber diameter of 12 μm, instead of microfibers, and the split fibers of 20 parts by mass were mixed together in the step of making the fiber slurry. In TABLE 1, mixture ratio and fiber diameter of the high-density polypropylene fibers are shown under the column of microfibers for convenience sake.

COMPARATIVE EXAMPLE 5

As compared to Embodiment 2, the negative electrode plate was formed shorter in length and therefore reduced in effective surface area so that the effective surface area per unit capacity (Y/X) was 53 cm$^2$/Ah. Accordingly, the positive electrode plate and the first and second separators were also formed shorter in length.

Active material amount of the positive electrode plate and the negative electrode capacity of the negative electrode plate were the same as in Embodiment 2. According to Comparative Example 5, the basis weights of the first and second separators and the thicknesses thereof in an unwound state were increased so that a total amount of the microfibers and the compound fibers included in the first and second separators and the density of the unwound separators were equal to those of the first and second separators of Embodiment 2.

Except the foregoing, a battery 5 of Comparative Example 5 was assembled in the same manner as in Embodiment 2.

COMPARATIVE EXAMPLE 6

A battery of Comparative Example 6 was assembled in the same manner as in Comparative Example 5 except that the compound fibers of 30 parts by mass which have an average fiber diameter of 20 μm, the microfibers of 15 parts by mass which have an average fiber diameter of 5 μm, and the split fibers of 55 parts by mass were mixed together in the step of making the fiber slurry.

5. Evaluation method (1) Evaluation of thicknesses and Densities of the First and Second Separators The thicknesses (winding thicknesses) and densities of the first and second separators in the electrode assembly were measured. Results are shown in TABLE 1.

The winding thicknesses were measured in a state where the electrode assembly was cut in the center in an axis direction. In other words, the thicknesses at three points, that is, a winding start end, an intermediate part, and a winding terminal end, of the first and second separators in cross-section of the electrode assembly were measured by microscope. An average value of the thicknesses of the above-mentioned six points in total is shown in TABLE 1 as winding thickness.

At the same time, the electrode assembly was disassembled, and active materials and the like attached to the first and second separators were removed by cleansing or the like. Subsequently, a portion of the separators which was sandwiched between the positive and negative electrode plates was cut off, and mass of the portion was measured. Based upon the size and mass of the portion of the separators, basis weight M of the portion of the separators was calculated. A value obtained by dividing the basis weight M thus calculated by winding thickness T (M/T) is shown in TABLE 1 as density of the separators in the electrode assembly.

(2) Evaluation of Injection Characteristics (Liquid Permeability)

When the batteries according to Embodiments and Comparative Examples were assembled by twenty for each, the vacuum injection was carried out. It was checked if the alkaline electrolyte permeated through the first and second separators within a given period of time from start of the injection. Among the twenty batteries according to each of Embodiments and Comparative Examples, if even one of the batteries was not permeated with the alkaline electrolyte within the given period of time, "Poor" is entered in the corresponding column under liquid permeability of TABLE 2. If all of the batteries were permeated with the alkaline electrolyte within the given period of time, "Good" is entered in the corresponding column.

The following evaluations were made using batteries into which the alkaline electrolyte permeated.

(3) Evaluation of Initial Resistance

Each of the batteries of Embodiments and Comparative Examples were charged at a charging current of 1 It up to a charging depth of 120 percent in an environment where temperature was 25° C. After one-hour quiescent time, the batteries were let stand (matured) for 24 hours in an environment where temperature was 70° C. Subsequently, the batteries were discharged at a discharging current of 1 It down to a final voltage of 0.3 V in an environment where temperature was 25° C. Thereafter, a charge-discharge cycle including the above-described steps of charge, quiescence, leaving, and discharge was carried out one more time.

The batteries processed through the two charge-discharge cycles (initial charge and discharge) were charged at a charging current of 6000 mA (1 It) up to 50 percent of battery capacity in an environment where temperature was 25° C. Subsequently, the batteries were subjected to 30 A discharge, 30 A charge, 60 A discharge, 60 A charge, 90 A discharge, 90 A charge, 120 A discharge, 120 A charge, 150 A discharge, and 150 A charge in the order named. During the charge-discharge cycle (incremental cycle), a conducting duration of the discharge and that of the charge were 10 seconds each, and there is provided a 10-minute quiescent time after each conduction. Battery voltage was measured immediately before the conduction of each discharge was finished, and relationship between the discharging current and the measured battery voltage was collinearly approximated by a least-square method. Inclination of an approximate straight line was obtained as initial battery resistance R1 (unit:mΩ). The obtained battery resistance R1 are shown in TABLE 2 in relative values (initial resistance index numbers) where the electrical resistance R1 of Embodiment 2 which is the smallest value of all is 100.

(4) Evaluation of Resistance Increase Characteristics (Resistance Increase Index Number) After the Charge-Discharge Cycle With respect to each of the batteries processed through the incremental cycle, 50 A intermittent charge and discharge were repeated by 4000 cycles in an environment where temperature was 45° C. while the charge was controlled so that SOC (state of charge) was maintained within a range under 100 percent, and that SOC fluctuation caused by 1-pulse charge and discharge was less than 25 percent. After the intermittent charge-discharge cycle (high-temperature pulse cycle), the batteries were discharged at a discharging current of 6000 mA (1 It) down to 0.9 V of final voltage. The batteries were then charged at a charging current of 6000 mA (1 It) up to 50 percent of the battery capacity in an environment where temperature was 25° C. Thereafter, the batteries were subjected to 30 A discharge, 30 A charge, 60 A discharge, 60 A charge, 90 A discharge, 90 A charge, 120 A discharge, 120 A charge, 150 A discharge, and 150 A charge in the order named. During the charge and discharge, too, a conducting duration of the discharge and that of the charge were 10 seconds each, and there is provided a 10-minute quiescent time after each conduction. Battery voltage was measured immediately before the conduction of each discharge was finished. Relationship between the discharging current and the measured battery voltage was linearly approximated by a least-square method. Inclination of the approximate straight line was obtained as battery resistance R2 after a high-temperature pulse cycle. Moreover, ratio of the battery resistance R2 after the high-pulse cycle to the initial battery resistance R1 (R2/R1) was obtained as rate of resistance increase that was caused by the high-pulse cycle. The resistance increase rates thus obtained are shown in TABLE 2 in relative values (resistance increase index number) where the resistance increase rate in Embodiment 2 which is the smallest value of all is 100.

(5) Evaluation of Resistance Index Number

A value obtained by dividing the product of the initial resistance index number and the resistance increase index number by 100 is shown in TABLE 2 as a resistance index number.

(6) Comprehensive Evaluation

The evaluations under (2) to (5) were considered in a comprehensive view. Results are shown in TABLE 2 in four levels.

TABLE 1

| | Construction | | | | | | | | | | |
|---|---|---|---|---|---|---|---|---|---|---|---|
| | First and second separators | | | | | | | | | | Negative electrode plate Effective surface area/ Capacity ($cm^2$/Ah) |
| | Mixing ratio (parts by mass) | | | Average fiber diameter (μm) | | | Hydrophilizing treatment | | Winding thickness (mm) | Density (kg/$m^3$) | |
| | Micro | Compound | Split | Micro | Compound | Split | 1st | 2nd | | | |
| Embodiment 1 | 10 | 90 | 0 | 2 | 12 | — | Fluorine | Sulfonation | 0.09 | 550 | 70 |
| Embodiment 2 | 15 | 85 | 0 | 2 | 12 | — | Fluorine | Sulfonation | 0.09 | 550 | 70 |
| Embodiment 3 | 15 | 85 | 0 | 2 | 12 | — | Sulfonation | Sulfonation | 0.09 | 550 | 70 |
| Embodiment 4 | 20 | 80 | 0 | 2 | 12 | — | Fluorine | Sulfonation | 0.09 | 550 | 70 |
| Example 1 | 15 | 85 | 0 | 2 | 12 | — | Fluorine | Sulfonation | 0.07 | 700 | 70 |
| Example 2 | 25 | 75 | 0 | 2 | 12 | — | Fluorine | Sulfonation | 0.09 | 550 | 70 |
| Example 3 | 10 | 80 | 10 | 2 | 12 | 4 | Fluorine | Sulfonation | 0.09 | 550 | 70 |
| Example 4 | 40* | 40 | 20 | 12* | 12 | 4 | Fluorine | Sulfonation | 0.09 | 550 | 70 |
| Example 5 | 15 | 85 | 0 | 2 | 12 | — | Fluorine | Sulfonation | 0.12 | 550 | 53 |
| Example 6 | 15 | 30 | 55 | 5 | 20 | 4 | Fluorine | Sulfonation | 0.12 | 550 | 53 |

TABLE 2

| | Evaluation | | | | |
|---|---|---|---|---|---|
| | Liquid permeability | Initial resistance index number | Resistance increase index number | Resistance index number | Comprehensive evaluation |
| Embodiment 1 | Good | 100.4 | 101.9 | 102.3 | Good |
| Embodiment 2 | Good | 100.0 | 100.0 | 100.0 | Excellent |
| Embodiment 3 | Good | 100.6 | 100.5 | 101.1 | Good |
| Embodiment 4 | Good | 102.2 | 100.0 | 102.2 | Good |
| Example 1 | Poor | 102.0 | 104.5 | 106.6 | Fair |
| Example 2 | Poor | 104.7 | 103.6 | 108.5 | Fair |
| Example 3 | Good | 102.0 | 102.9 | 105.0 | Fair |
| Example 4 | Good | 105.4 | 105.0 | 110.7 | Fair |
| Example 5 | Good | 108.7 | 114.5 | 124.5 | Poor |
| Example 6 | Good | 109.1 | 116.0 | 126.6 | Poor |

6. Evaluation Result

It is obvious from TABLES 1 and 2, Embodiment 2 is the most excellent overall. More specifically, the following matters are evident from the TABLES.

(1) Embodiments 1 to 4 are smaller in resistance index number than Comparative Examples 1 to 6. A reason for this is that the permeability and retention of the alkaline electrolyte in the first and second separators are good in Embodiments 1 to 4, as compared to Comparative Examples 1 to 6.

(2) In comparison between Embodiment 2 and Embodiment 3 in which the first separators are subjected to respective hydrophilizing treatments, Embodiment 2 in which the first separator is subjected to the fluorine gas treatment is smaller in resistance index number than Embodiment 3 in which the first separator is subjected to the sulfonation treatment. This is attributed to the fact that the alkaline electrolyte is more evenly distributed since a fluorine gas-treated separator with high ability to absorb the alkaline electrolyte is used for either one of the first and second separators.

(3) In comparison between Embodiment 1 and Embodiment 2 in which the mixing ratio of the fibers is different, Embodiment 2 is smaller in resistance index number than Embodiment 1. This result shows that the fiber mixing ratio of Embodiment 2 is more desirable than that of Embodiment 1 in terms of the permeability and retention of the alkaline electrolyte in the first and second separators.

(4) In Comparative Example 1 where the density of the first and second separators in the electrode assembly is high, there generates a failure of permeation. This is because the fine pores in the separators are miniaturized due to the high density, which makes difficult the permeation of the alkaline electrolyte.

Similarly to Comparative Example 1, a failure of permeation occurs also in Comparative Example 2 in which the mixture ratio of the microfibers is high. This happens because the increase of the ratio of the microfibers miniaturizes the fine pores in the separators and makes difficult the permeation of the alkaline electrolyte.

Moreover, the resistance index numbers are large in Comparative Examples 1 and 2. This is due to the following facts.

In Comparative Examples 1 and 2, the initial resistance index numbers are large because the permeability of the alkaline electrolyte is low. Beside that, during the high-temperature pulse cycle, the hydrogen storage alloy contained in the negative electrode plate is oxidized, and the positive electrode plate is expanded. As a result, the alkaline electrolyte is consumed and absorbed, so that the electrolyte in the separators is reduced. If the alkaline electrolyte in the separators is reduced, the alkaline electrolyte is isolated or localized in the separators, and this complicates and stretches the conductive paths in the separators. Consequently, the electrical resistance between the positive and negative electrode plates is increased, and the resistance index number also becomes large.

In Comparative Examples 1 and 2, the average fiber diameter is reduced to increase the surface area, so that the retention of the alkaline electrolyte is excellent, as in Embodiments 1 to 3. Comparative Examples 1 and 2, however, are low in permeability of the alkaline electrolyte in the first place, so that the liquid retention characteristics are not effectively exerted.

(5) In Comparative Examples 3 and 4 where the split fibers having a sector-shaped cross-section are used, the initial resistance index numbers, the resistance increase index numbers, the resistance index numbers, and especially the resistance increase rate are large, as compared to Embodiments 1 to 3 in which only the fibers having a virtually circular cross-section are used. This is the result of the following facts.

If the separators include the modified split fibers, the fine pores of the separators are not uniform in size. It is difficult for the alkaline electrolyte to permeate into small, especially minute fine pores, so that the alkaline electrolyte is easily isolated or localized in the separators. Therefore, as stated in (4), when the electrolyte in the separators is reduced during the high-temperature pulse cycle, the conductive paths in the separators become complicated and stretched. This accordingly increases the electrical resistance of between the positive and negative electrode plates, and also increases the resistance index number.

(6) The resistance index numbers are large in Comparative Examples 5 and 6 where the effective surface area per unit capacity of the negative electrode plate is smaller than in Embodiments 1 to 4 and Comparative Examples 1 to 4. This is because reaction resistance is high due to the small effective surface area of the positive and negative electrode plates, and that a heat value during the high-temperature pulse cycle is increased.

In Comparative Examples 5 and 6, there generates no failure of permeation. This proves that as long as the effective surface area per unit capacity of the negative electrode plate is less than 70 $cm^2/Ah$, the permeation of the alkaline electrolyte which is determined by the form of the separators does not matter.

Other than the above-described Embodiments and Comparative Examples, in case that the proportion of the microfibers to the blend of the compound fibers and the microfibers was more than 25 percent by mass, the electrolyte did not permeate into the fine pores, and there generated many failures of injection. In case that the proportion of the microfibers to the blend of the compound fibers and the microfibers was less than 5 percent by mass, resistance was considerably increased after the cycle due to a reduction in liquid retention ability.

The present invention is not limited to the above-described aspects and Embodiments, and it may be modified in various ways. Although the positive electrode plate 6 is a sintered nickel electrode, a non-sintered nickel electrode may be used instead.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel hydrogen storage battery, comprising:
a spiral electrode assembly contained in a container with an alkaline electrolyte, the electrode assembly including
a negative electrode plate containing hydrogen storage alloy particles and a nonaqueous polymer binder for binding the hydrogen storage alloy particles and having an effective surface area per unit capacity of 70 $cm^2$/Ah or more,
a positive electrode plate that is wound with the negative electrode plate in a spiral configuration and includes nickel hydroxide as positive active material,
a first separator disposed between an outer surface of the positive electrode plate and an inner surface of the negative electrode plate, and
a second separator disposed between an inner surface of the positive electrode plate and an outer surface of the negative electrode plate, wherein
the first and second separators between the positive and negative electrode plates have a density in an inclusive range of from 450 $kg/m^3$ to 600 $kg/m^3$, wherein
each of the first and second separators is formed by subjecting a nonwoven fabric to hydrophilizing treatment, the nonwoven fabric of the first and second separators having a virtually circular cross-section and being formed by combining compound fibers and microfibers through a melting portion of the compound fibers, the compound fibers being constituted by polyolefin-based resin and having a diameter in an inclusive range of from 5 μm to 15 μm and an outer circumferential surface provided at least in a part thereof with the melting portion having a lower melting point than other portion, the microfibers being constituted by polyolefin-based resin and having a virtually circular cross-section and a diameter in a range of from 1 μm to less than 5 μm, wherein
proportion of the microfibers to a blend of the microfibers and the compound fibers falls in a range of from 10 percent by mass to 20 percent by mass, and wherein
at least one of the nonwoven fabrics of the first and second separators is subjected to sulfonation treatment as the hydrophilizing treatment.

2. The nickel hydrogen storage battery according to claim 1, wherein:
one of the nonwoven fabrics of the first and second separators is subjected to the sulfonation treatment as the hydrophilizing treatment, and
the other nonwoven fabric is subjected to at least one of hydrophilizing treatments, which is selected from fluorine gas treatment, plasma treatment and surfactant treatment, as the hydrophilizing treatment.

3. The nickel hydrogen storage battery according to claim 2, wherein:
the nonwoven fabric of the first separator is subjected to at least one of the hydrophilizing treatments, which is selected from fluorine gas treatment, plasma treatment and surfactant treatment, and
the nonwoven fabric of the second separator is subjected to the sulfonation treatment.

4. The nickel hydrogen storage battery according to claim 3, wherein:
the nonwoven fabric of the first separator is subjected to the fluorine gas treatment.

5. The nickel hydrogen storage battery according to claim 4, wherein:
the proportion of the microfibers to the blend of the microfibers and the compound fibers falls in an inclusive range of from 13 percent by mass to 17 percent by mass.

6. The nickel hydrogen storage battery according to claim 1, wherein:
the proportion of the microfibers to the blend of the microfibers and the compound fibers falls in an inclusive range of from 13 percent by mass to 17 percent by mass.

7. The nickel hydrogen storage battery according to claim 2, wherein:
the proportion of the microfibers to the blend of the microfibers and the compound fibers falls in an inclusive range of from 13 percent by mass to 17 percent by mass.

8. The nickel hydrogen storage battery according to claim 3, wherein:
the proportion of the microfibers to the blend of the microfibers and the compound fibers falls in an inclusive range of from 13 percent by mass to 17 percent by mass.

* * * * *